United States Patent
Yamada et al.

(10) Patent No.: US 6,549,720 B1
(45) Date of Patent: Apr. 15, 2003

(54) PICTURE SIGNAL PROCESSING METHOD AND APPARATUS, PICTURE SIGNAL RECORDING METHOD AND APPARATUS AND RECORDING MEDIUM

(75) Inventors: Makoto Yamada, Tokyo (JP); Satoshi Tsujii, Tokyo (JP); Naoki Morimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/281,664

(22) Filed: Mar. 30, 1999

(30) Foreign Application Priority Data

Apr. 1, 1998 (JP) .............................. 10-089101

(51) Int. Cl.$^7$ .............................. H04N 7/08; H04N 5/91; H04N 7/00
(52) U.S. Cl. .............................. 386/95; 386/123; 386/46
(58) Field of Search .............................. 386/95, 109, 111, 386/112, 123, 105, 106, 107, 117, 125, 126, 124, 46, 1, 27, 33, 37, 38, 45; H04N 7/08, 5/91, 7/00

(56) References Cited

U.S. PATENT DOCUMENTS 5,377,051 A * 12/1994 Lane et al.
5,583,653 A * 12/1996 Timmermans

* cited by examiner

*Primary Examiner*—Robert Chevalier
(74) *Attorney, Agent, or Firm*—Frommer Lawrence & Haug LLP; William S. Frommer; Glenn F. Savit

(57) ABSTRACT

A picture signal processing method and apparatus, a picture signal recording method and apparatus, and a recording medium, in which resolution switching is effected seamlessly. To this end, a controller 19 has the function of reading out the identification information specifying the resolution of the bitstream and the relation between the recording units, from a user data region provided in a video stream as a minimum unit which permits switching of the resolution in a MPEG 2 standard bitstream, and of switching the resolution of the picture signals associated with the recording units.

18 Claims, 8 Drawing Sheets

| video sequence(){ | No.of bits | Mnemonic |
|---|---|---|
| next_start_code() | | |
| sequence_header() | | |
| if(nextbits()==extension_start_code){ | | |
| sequence_extension() | | |
| do{ | | |
| extension_and_user_data(0) | | |
| do{ | | |
| if(nextbits()==group_start_code){ | | |
| group_of_pictures_header() | | |
| extension_and_user_data(1) | | |
| } | | |
| picture_header() | | |
| picture_coding_extension() | | |
| extensions_and_user_data(2) | | |
| picture_data() | | |
| }while((nextbits()==picture_start_code)|| | | |
| (nextbits()==group_start_code)) | | |
| if(nextbits() !=sequence_end_code) { | | |
| sequence_header() | | |
| sequence_extension() | | |
| } | | |
| } while(nextbits() !=sequence_end_code) | | |
| }else{ | | |
| /*ISO/IEC 11172-2*/ | | |
| } | | |
| sequence_end_code | 32 | bslbf |
| } | | |

Video Sequence

FIG.3

PICTURE SIGNAL PROCESSING METHOD AND APPARATUS, PICTURE SIGNAL RECORDING METHOD AND APPARATUS AND RECORDING MEDIUM

BACKGROUND OF THE INVENTION

1. Field of the Invention

This invention relates to a picture signal processing method and apparatus, a picture signal recording method and apparatus, and a recording medium, relevant to the expression of a bitstream syntax of the MPEG (Moving Pictures Experts Group) 2 standard which provides seamless reproduction of resolution switching.

2. Description of the Related Art

The MPEG (Moving Pictures Experts Group) 2 is an encoding system used in broadcast or AV equipments, and which has become extremely popular as an information compression technique for pictures/ speech/ data.

In the MPEG 2, input pictures/ speech/ data etc are encoded depending on the bit rate. As for the pictures, each picture is divided in m×n blocks and transformed by orthogonal transform to concentrate the signal power in order to compress the total information volume.

The picture data, encoded by the MPEG 2, assume a hierarchical structure from a sequence layer to a block layer.

That is, picture data of the MPEG 2 is made up of a sequence layer of a picture group having a series of the same attributes, a GOP (group-of-picture) layer, representing the minimum unit of a picture group as a random-accessing unit, a picture layer of a common attribute to a sole picture, a slice layer of the common information to a small picture obtained on optionally splitting a sole picture, a macro-block layer of the information common to pixel blocks (macro-blocks) obtained on further splitting the slice layer, and a block layer of transform coefficients per se.

Of these, the picture layer has, as its object, a picture of 704(H)×480(V), in e.g., television signals of the NTSC system, in accordance with the main level format.

The respective pictures are classified into an intra-picture (I-picture), as an intra-coded picture, a forward predictive-coded picture or a P-picture, predictively coded in the forward direction in the display sequence, and a bidirectionally predictivecoded picture or a B-picture, predictive-coded in both the forward and backward directions in the display sequence. These different pictures collectively make up a group-of-pictures (GOP) layer.

Meanwhile, the processing of movies in the MPEG 2, such as resolution switching, is usually carried out in a video sequence unit, which is the minimum unit enabling the definition of resolution.

However, a sequence as a picture source means no other than the video sequence which is a unit defining the resolution. Thus, the encoding size, that is the resolution, cannot be switched by a control operation in the course of the sequence.

The result is that the resolution cannot be switched depending on the sorts of the pictures, such as still pictures or movies undergoing vivid motions, thus worsening the compression efficiency in encoding.

SUMMARY OF THE INVENTION

It is therefore an object of the present invention to provide a picture signal processing method and apparatus, a picture signal recording method and apparatus, and a recording medium in which picture signals are switched in resolution depending on the sorts of the pictures, such as still pictures or movies undergoing vivid motions.

The present invention adopts the concept of a movie sequence and prescribes the movie sequence as being a set of video sequences. To this end, the beginning and the end of the movie sequence are clarified. The resolution switching is adapted to be made freely in the movie sequence to improve the compression ratio. Specifically, the same encoding size is used from the beginning to the end of the routine MPEG 2 encoding. According to the present invention, the encoding size is switched appropriately to improve the compression ratio.

BRIEF DESCRIPTION OF THE DRAWINGS

FIG. 3 shows a video sequence.

DESCRIPTION OF THE PREFERRED EMBODIMENTS

Figure 1:
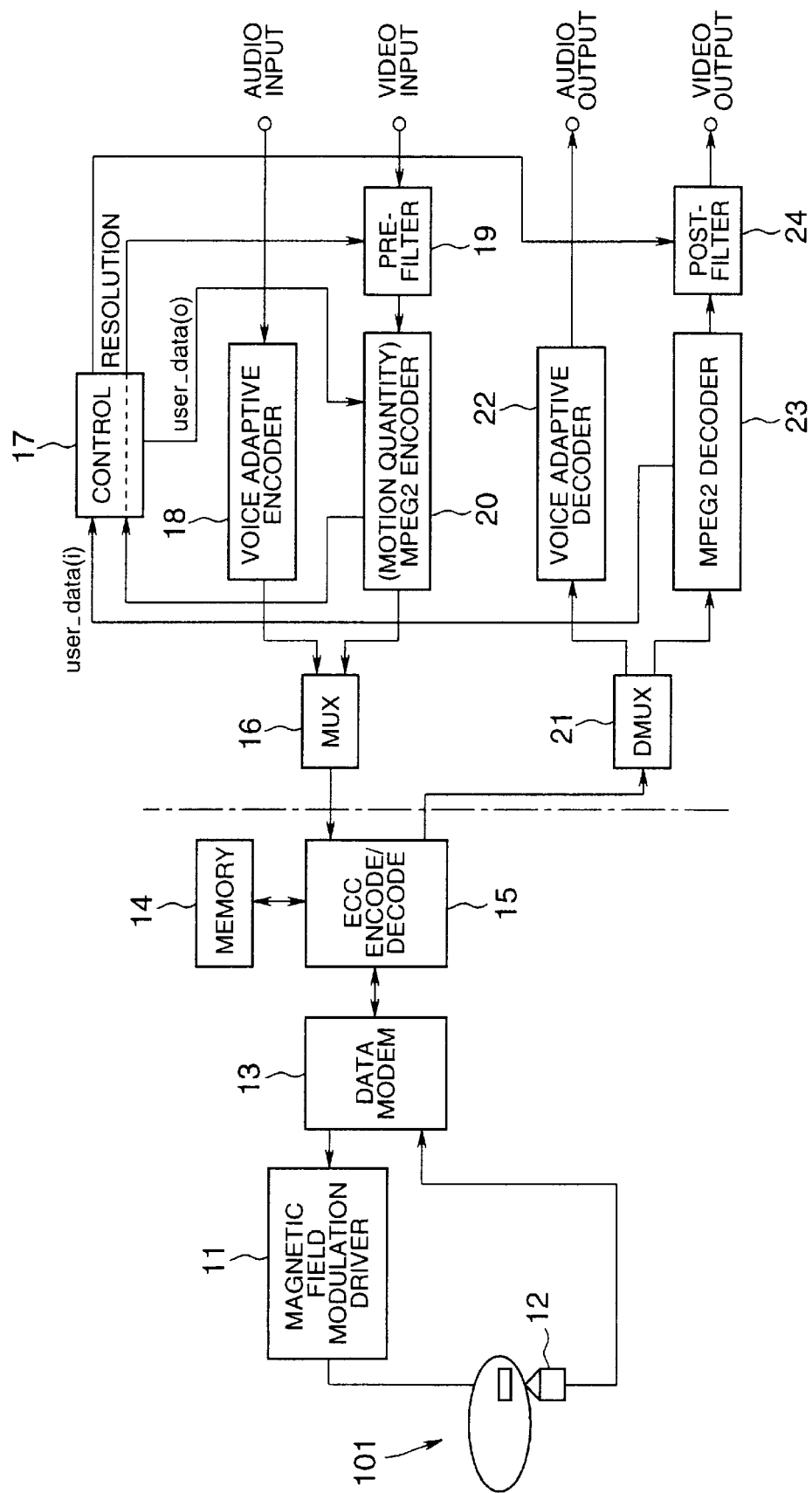
FIG. 1 is a schematic block diagram showing a structure of a recording/reproducing apparatus according to a first embodiment of the present invention.
Figure 2:
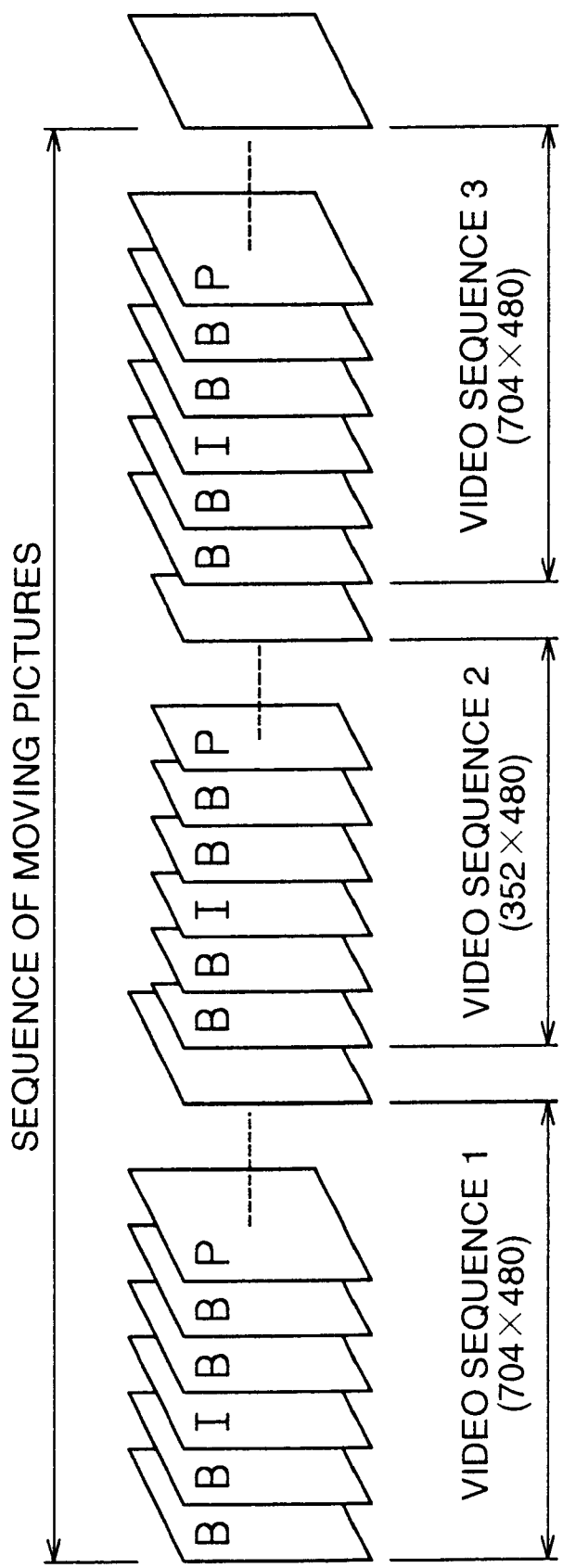
FIG. 2 illustrates a sequence of movies.

Referring to the drawings, preferred embodiments of the present invention will be explained in detail.

As a first embodiment, a recording/reproducing apparatus for recording/reproducing data for an optical disc is explained. This recording/reproducing apparatus records the identification information in an information area proper to a bitstream of the MPEG 2 standard.

Referring to FIG. 1, the recording/reproducing apparatus includes a pre-filtering unit 19 for processing input video signals with pre-set filtering, an MPEG 2 encoder 20 for converting signals from the pre-filtering unit 19 into a MPEG 2 bitstream, and an adaptive transform acoustic encoder 18 for processing the input audio signals with speech adaptive transform encoding, such as so-called ATRAC (adaptive transform acoustic coding). The recording/reproducing apparatus also includes a MUX (multiplexer) 16 for multiplexing the bitstream encoded by the MPEG 2 encoder 20 and the encoder 18.

As for the flow of video signals, the video signals are modified in filtering characteristics in the pre-filtering unit 19, depending on the resolution, in order to process the video signals with filtering. The signals from the pre-filtering unit 19 are encoded by the MPEG 2 encoder 18.

As for the flow of audio signals, the signals are bit-compressed by the adaptive transform acoustic encoder 18.

The video signals, encoded by the MPEG 2 encoder 20, and the audio signals, encoded by the adaptive transform acoustic encoder 18, are multiplexed by the MUX 16.

Also, the recording/reproducing apparatus includes an ECC encoding/decoding unit 15, for encoding/decoding the ECC (error correction code), a memory 14 for storing data under control by the ECC encoding/decoding unit 15, and a data modulation/demodulation unit 13 for modulating/demodulating data. The recording/reproducing apparatus also includes a magnetic field modulating driver 11 for applying a modulated magnetic field across an optical disc 101 and an optical pickup 12 for illuminating/receiving the laser light for the optical disc 101.

In the ECC encoding/decoding unit 15, the so-called ECC for error correction and synchronization patterns are appended to the data. The data modulation/demodulation unit 13 sequentially reads out data stored in the memory 14 and modulates the read-out data in a pre-set fashion to route the modulated data to the magnetic field modulating driver 11.

The magnetic field modulating driver 11 is responsive to furnished data to drive the coil for the magnetic field to apply the magnetic field across the magnetic region of the optical disc 101. The optical pickup 12 illuminates a recording laser light beam or a reproducing laser light beam on the optical disc 101, while photoelectrically converting the reproducing laser light beam reflected from the optical disc 101 into electrical signals which are outputted as playback RF signals.

The data modulation/demodulation unit 13 demodulates the playback RF signals in a pre-set fashion and stores the demodulated data in the memory 14. The ECC encoding/decoding unit 15 corrects the data for errors.

The recording/reproducing apparatus also includes a DMUX (demultiplexer) 21, an adaptive transform acoustic decoding unit 22 for decoding the audio data from the DMUX 21 by so-called adaptive acoustic transform, a MPEG 2 decoder 23 for decoding video data from the DMUX 21 in accordance with the MPEG 2 and a post-filtering unit 24 for filtering the signals from the MPEG 2 decoder 23 in a pre-set fashion.

Output data of the ECC encoding/decoding unit 15 are separated by the DMUX 20 into video data and audio data. The audio data are processed by the adaptive transform acoustic decoding unit 22 and subsequently outputted, while the video data are processed by the MPEG 2 decoder 23 and the post-filtering unit 24 and subsequently outputted.

The recording/reproducing apparatus includes a controller 17 for controlling the respective parts of the present movie compression/expansion device. This controller 17 is constituted as a so-called micro-computer, made up of, for example, a CPU, a ROM and a RAM.

The controller 17 detects the amount of motion of the MPEG 2 encoder 20, determines the resolution in meeting with the amount of motion to prepare resolution data, appends the resolution data to the user data and outputs the resulting data to the MPEG 2 encoder 20. The controller 17 is also responsive to the resolution to control the pre-filtering unit 19. For example, the controller 17 performs control so that the resolution of a movie proximate to a still picture is kept at 704×480 while that for a movie exhibiting vivid motion is set to 352×480 and that for a movie exhibiting only limited motion is set to an intermediate value of 528×480. During reproduction, the controller 17 retrieved user data from the MPEG 2 decoder 23 to control the post-filtering unit 24 responsive to the resolution.

It is provided that the video sequence of the MPEG 2 standard bitstream begins with a sequence header and ends with a sequence end. The encoding size in this video sequence, that is the resolution, is the uniquely determined recording unit.

Figure 4:
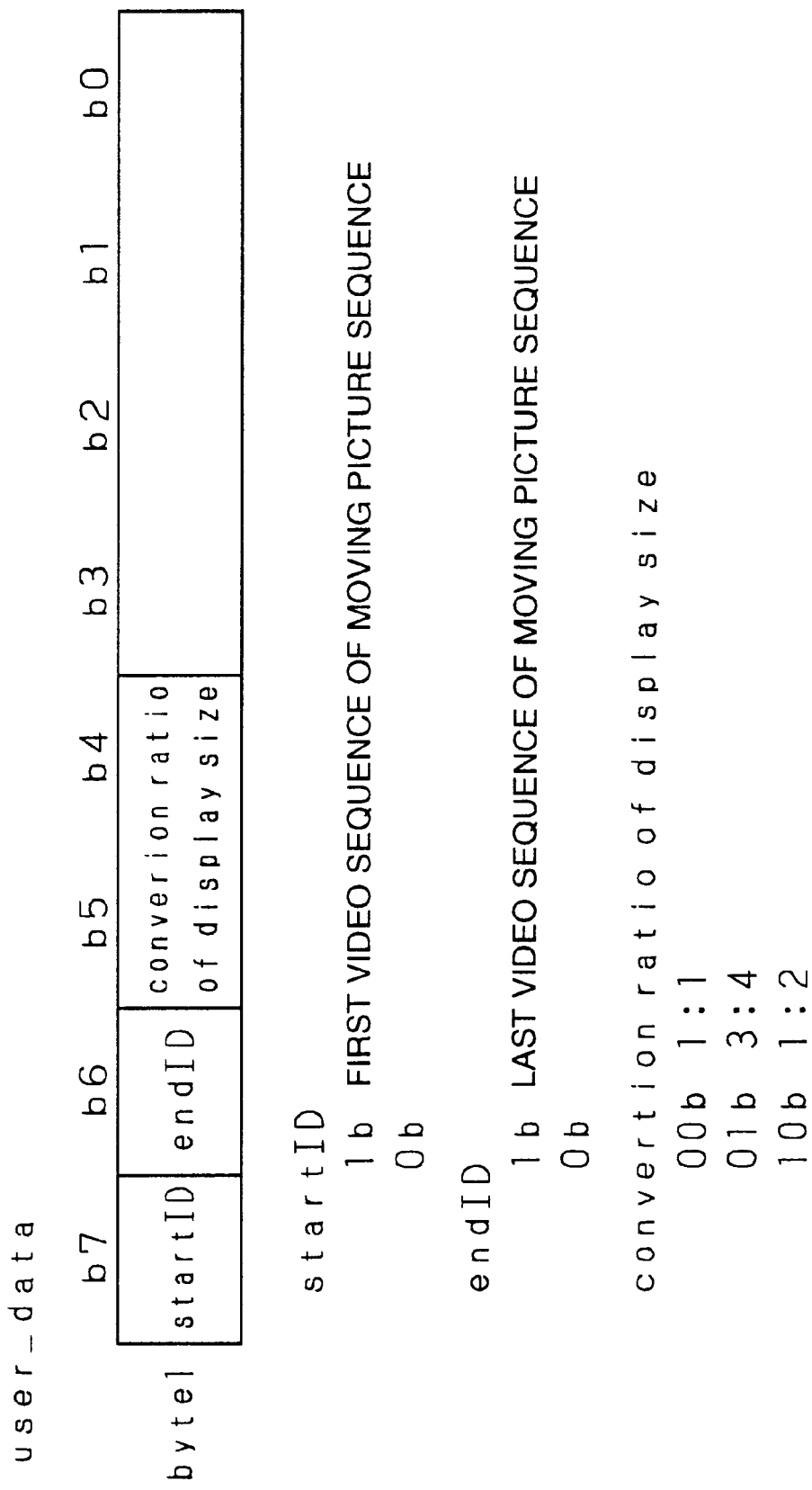
FIG. 4 shows a data structure illustrating the structure of user data.

That is, there is a unit termed the video sequence, representing a movie, at a start end (start_end), as shown in FIG. 4, and the resolution is defined with the video sequence as a unit.

Usually, a sole picture source (picture program) is no other than the video sequence defined by the MPEG 2, such that the resolution cannot be switched partway.

Therefore, a number of these video sequences are collected together and newly defined as a movie sequence.

That is, the moving picture sequence is defined as a set of video sequences the resolution of which is determined uniquely.

In this movie sequence, there may exist video sequences having different encoding sizes (resolutions) such that a resolution is used in a video sequence 1 and a resolution in the horizontal direction is halved in a video sequence 2.

If the resolution of 704×480 pixels is used for a movie close to a still picture, a resolution of 704×480 pixels is used for the video sequence 1 and the video sequence 3, which are movies close to a still picture, and a resolution of 352×480 pixels, which is one-half the resolution of 704×480 pixels, is used for the video sequence 2 which is a movie with vigorous motion.

In this case, if the movie sequence is construed to be the beginning of each video sequence, the beginning and the end of the movie sequence defined as the set of the video sequences cannot be discriminated from each other.

In the first embodiment, user data (user_data) of the sequence header (sequence_header) in the video sequence are utilized for specifying the beginning and the end of the movie sequence as shown in FIG. 3 and for specifying the resolution.

That is, the movie sequence is recorded at consecutive positions by a disc by a recording/reproducing apparatus. For clarifying the beginning and the end points of the movie sequence, recorded consecutively in this manner, IDs which discriminate the first video sequence and the last video sequence of the movie sequence are defined. These IDs are set at the time of encoding.

During decoding of the movie sequence, the beginning and the end points of the movie sequence on the disc are clarified by the IDs discriminating the first video sequence and the last video sequence making up the movie sequence.

For the IDs specifying the positions of the video sequences in these movie sequences, 1 byte of the user data area that can be defined from one video sequence to another is used.

That is, in the byte 1 of the user data, shown in FIG. 4, the 7th bit b7 is a start ID, the sixth bit b6 is the end ID, and the fifth and fourth bit b5, b4 are the display size conversion ratio. In FIG. 4, 'b' signifies that the binary notation system is used.

If the start ID is '1', it is defined as meaning the first video sequence of the movie sequence. If the end ID is '1', it is defined as the last video sequence of the movie sequence.

As the display size conversion ratio, the conversion ratio in the horizontal and vertical directions are defined. For example, if the display conversion ratio is '00'(1:1), the resolution of 704×480 is kept. The display conversion ratio of '01'(3:4) means multiplication by ¾ at the time of encoding so that the size is 528×480. Similarly, the display conversion ratio of '10'(1:2) means multiplication by ½ at the time of encoding so that the size is 352×480.

For decoding, the resolution is restored by back conversion to the original resolution of 704×480. This provision is inherently meant for distinguishing from the case of encoding at the resolution of 352×480 by taking no measures.

By providing these provisions as the format, it is judged which sequence the video sequence has with respect to the movie sequence. In addition, these provisions are used as a material for judgment at the time of decoding. That is, it can be known from the above user data from which portion to which portion the movie sequence is to be decoded with which resolution.

Figure 5:
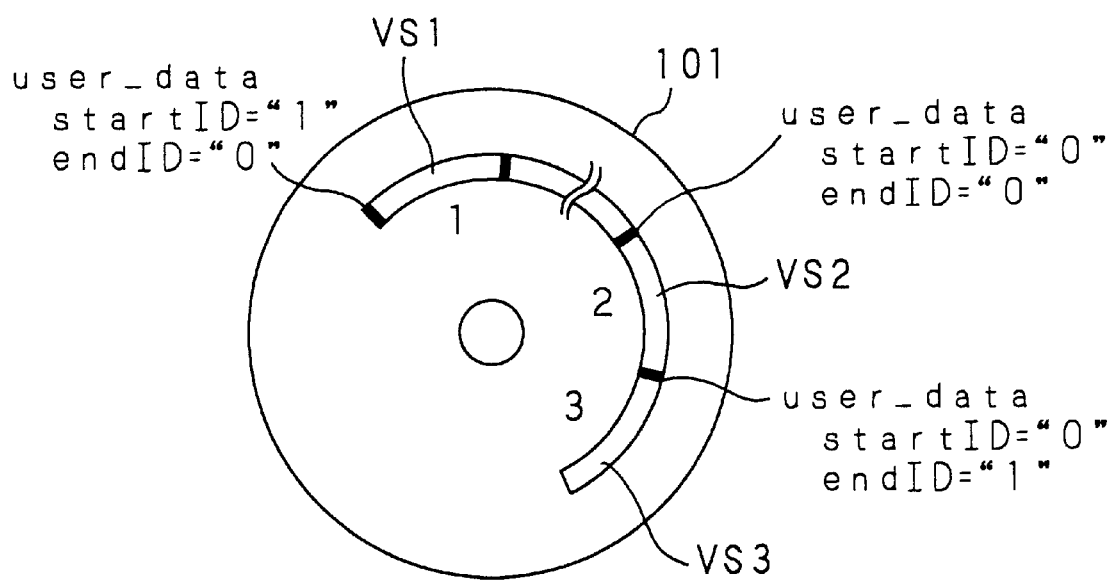
FIG. 5 illustrates the recording of a sequence of movies to a disc medium in a first embodiment.

The recording in a disc medium as a disc-shaped recording medium of the movie sequence is explained by a schematic view of FIG. 5.

In the disc medium 101, there is shown the state in which the video sequences VS1, VS2 and VS3 are written on the video sequence basis.

In the user data of the first video sequence VS1, the start ID and the end ID are '1' and '0', respectively. In the user data of the next video sequence, the start ID and the end ID are both '0', whereas, in the user data of the last video sequence, the start ID is '0' and the end 'ID' is '1'.

Form this it is seen that the video sequence VS1 is the first video sequence in the movie sequence and that the video sequence VS3 is the last video sequence in the movie sequence.

As a second embodiment of the present invention, a recording/reproducing apparatus for recording/reproducing picture data for an optical disc is explained. The recording/reproducing apparatus of the second embodiment records the identification information on a management file.

Figure 6:
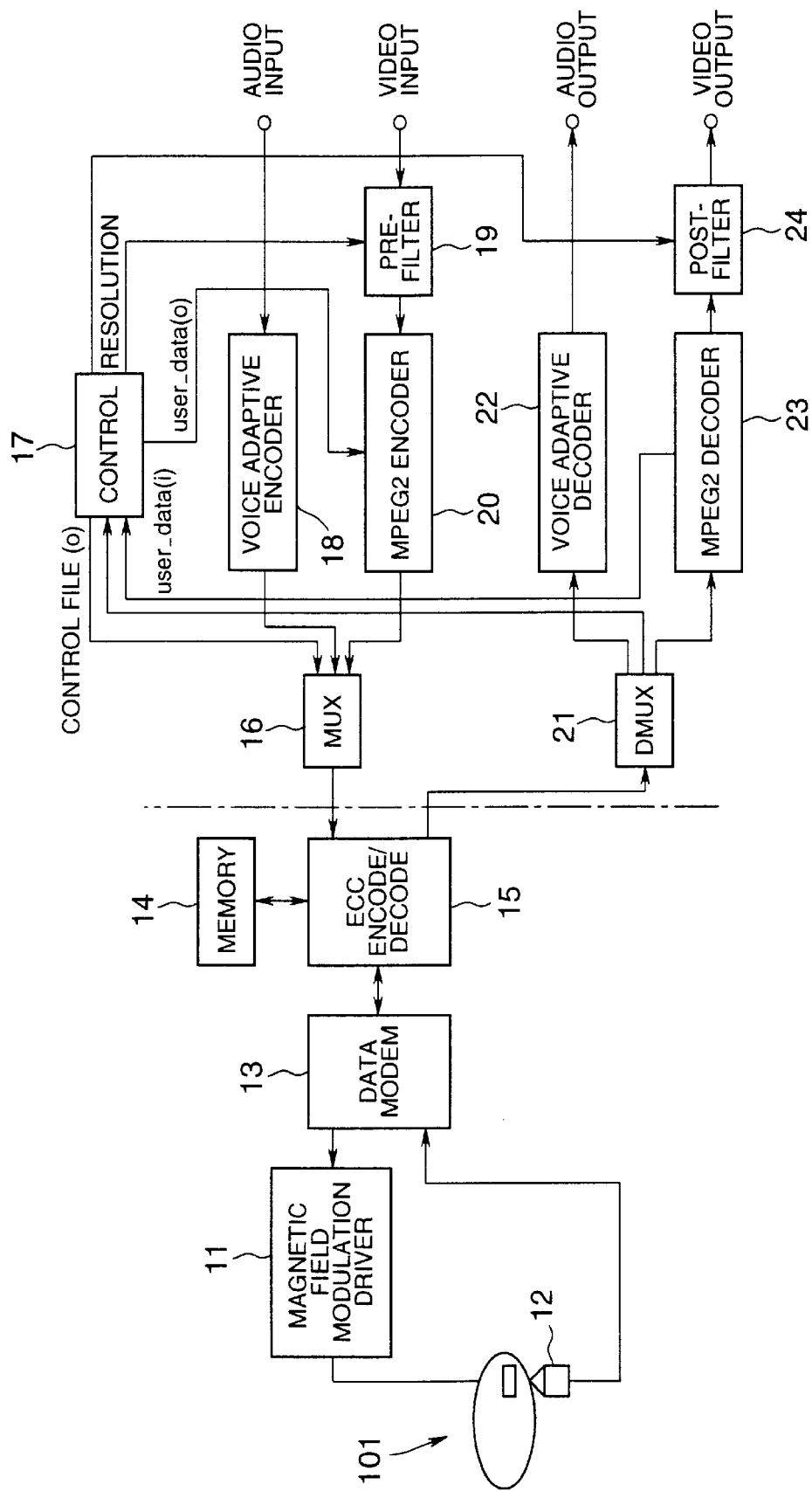
FIG. 6 is a schematic block diagram showing the structure of a recording/reproducing apparatus in a second embodiment.

Referring to FIG. 6, a moving picture compression expansion apparatus includes a pre-filtering unit 19 for performing pre-set filtering on input video signals, an MPEG 2 encoder 20 for converting signals from the pre-filtering unit 19 into a MPEG 2 bitstream, a so-called adaptive transfonn acoustic encoder 18 for performing adaptive acoustic encoding on the input audio signals and a MUX (multiplexer) 16 for multiplexing the bitstream encoded by the MPEG 2 encoder 20 and the adaptive transform acoustic encoder 18.

The moving picture compression expansion apparatus also includes an ECC encoding/decoding unit 15 for encoding or decoding the so-called ECC (error correction code), a memory 14 for storing data under control by the ECC encoding/decoding unit 15, a data modulation/demodulation unit 13 for modulating or demodulating data, a magnetic field modulating driver 11 for applying a modulated magnetic field across the optical disc 101 and an optical pickup 12 for illuminating/receiving the laser light for the optical disc 101.

The moving picture compression expansion apparatus also includes a DMUX (demultiplexer) 20, an adaptive transform acoustic decoding unit 22 for audio data from the DMUX 20, a MPEG 2 decoder 23 for decoding the video data in accordance with the MPEG 2 and a post-filtering unit 24 for performing pre-set filtering on the signals from the MPEG 2 decoder 23.

The moving picture compression expansion apparatus further includes a controller 17 for controlling various parts of the moving picture compression expansion apparatus. This controller is constituted as a so-called micro-computer made up of, for example, a CPU, a ROM and a RAM.

The characteristic portions of the recording/reproducing apparatus of the second embodiment are now explained. The controller 17 multiplexes a management file, indicating the position of the above-described video sequence, at the time of multiplexing by the MUX 16, to write the multiplexed management file.

During reproduction, the controller 17 reads out the management file and switches the post-filtering unit 24 depending on the resolution on the video sequence basis. The operation of the other circuit portions is the same as that of the above described first embodiment and hence is not explained specifically.

If, in this second embodiment, a movie sequence is to be recorded on a disc medium, a hysteresis file or a management file, showing the manner in which recording has been made on the disc medium, is necessarily prepared and the recording manner is prescribed by the management file.

For example, in this second embodiment of the recording/reproducing apparatus, all addresses are recorded from the outset on the disc medium. The movie sequence is sequentially recorded in the vacant region on the disc medium. The totality of positions on the disc medium are specified by addresses.

Figure 7:
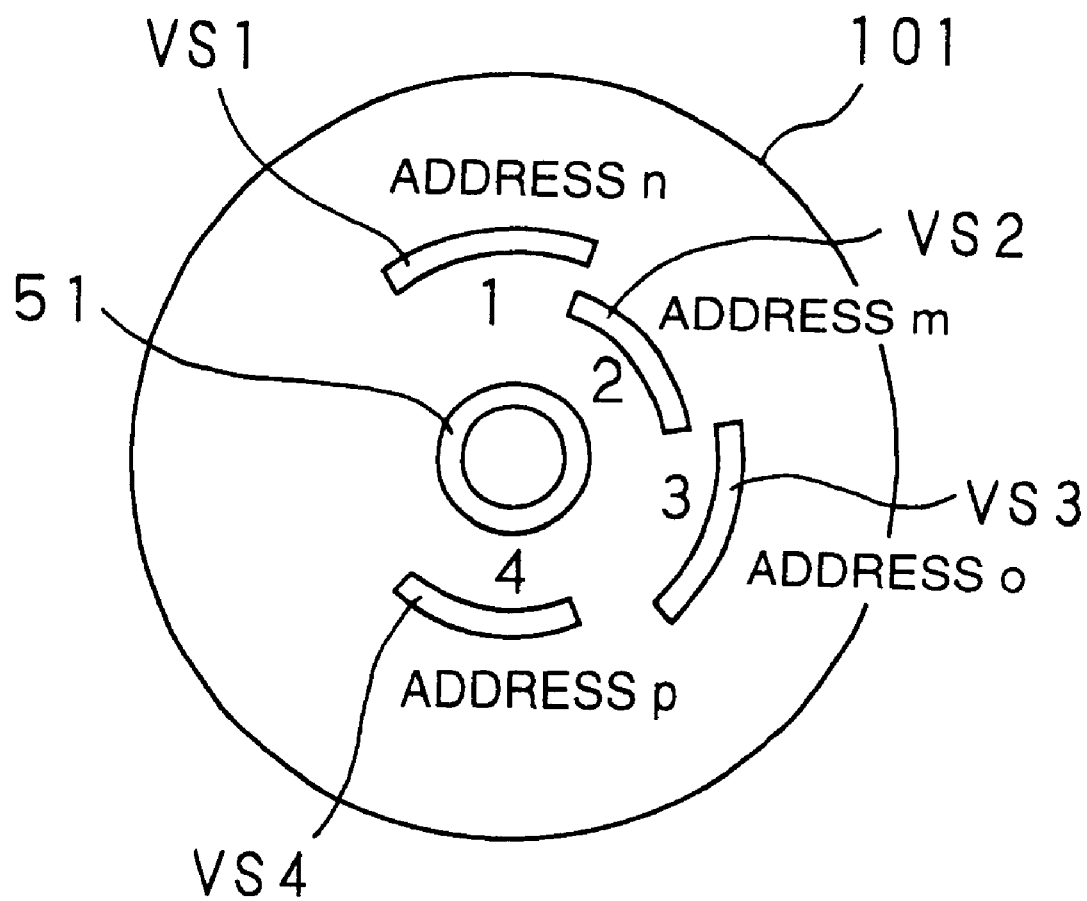
FIG. 7 illustrates the recording of a sequence of movies to a disc medium in a second embodiment.

Referring to FIG. 7, the first-recorded video sequence VS1 is recorded at a nth address on the disc medium 101, the next-recorded video sequence VS2 is recorded at a mth address and so forth until the last-recorded video sequence VS4 is recorded at the pth address.

In an actual management file, there is written in a disc area a file stating that the first-recorded video sequence VS1 is at the nth address, the second-recorded video sequence VS2 is at the mth address, and so forth. The addresses on the disc in which have been recorded the video sequences in the movie sequence are recorded as a management file in a region separate from the region for the data of the movie sequence.

If, after the end of recording of the movie sequence, this management file is checked, it can readily be seen in which addresses have been recorded the video sequences in the movie sequence. That is, by utilizing this file, it is possible to identify the beginning and the end of each video sequence in the movie sequence.

This second embodiment is applied when the management file is used for combining video sequences of different resolutions to a movie sequence.

Figure 8:
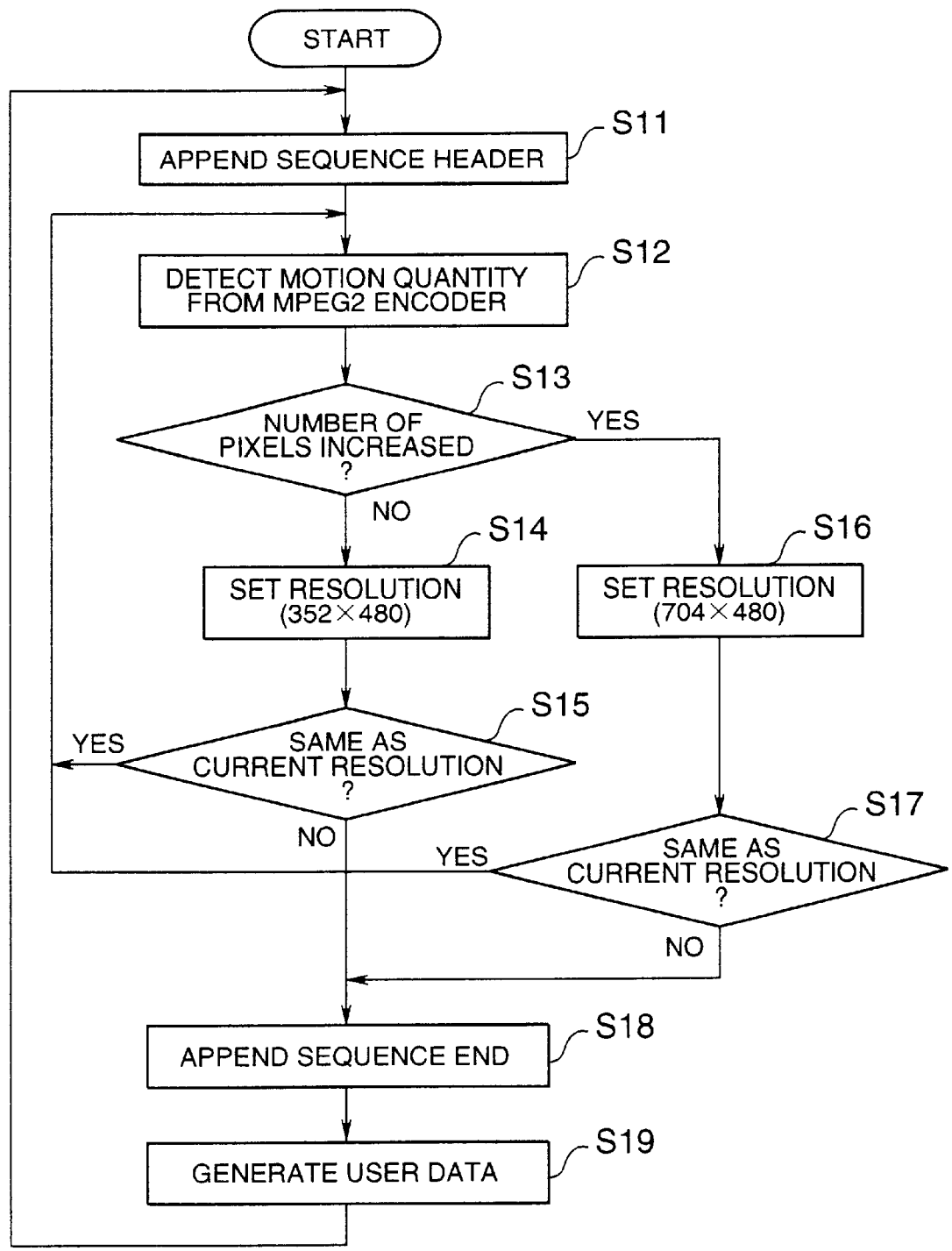
FIG. 8 is a flowchart for illustrating a sequence of process steps of the recording/reproducing method.

Referring to the flowchart of FIG. 8, a series of process steps of the recording/reproducing method are now explained.

At a first step S11, a sequence header is appended to a video sequence and, at the next step S12, the amount of motion is detected from the MPEG 2 encoder.

At the next step S13, it is verified, based on the amount of motion detected by the MPEG 2 encoder at step S12, whether or not the number of pixels is to be increased. If the number of pixels is to be increased, the 'YES' path is followed to step 6 and, if otherwise, the 'NO' path is followed to step S14.

At steps S14 and S16, the resolution is determined. That is, at step S14, the resolution is set to 352×480 and processing transfers to step S15. At step S16, the resolution is set to 704×480 and processing transfers to step S17.

At step S15, it is checked whether or not the resolution as set at step S14 is the same as the current resolution. If the resolution as set at step S14 is the same as the current resolution, the 'YES' path is followed to step S12 and, if otherwise, the 'NO' path is followed to step S18.

At step S17, it is checked whether or not the resolution as set at step S16 is the same as the current resolution. If the resolution as set at step S16 is the same as the current resolution, the 'YES' path is followed to step S12 and, if otherwise, the 'NO' path is followed to step S18.

At step S18, a sequence end is appended to the video sequence and processing transfers to step S19. At step S19, user data is formulated and written in a pre-set region. After the end of this step S19, processing reverts to step S11.

The recording medium is now explained. This recording medium has recorded thereon picture signals encoded in accordance with the MPEG 2 standard.

In the MPEG 2 standard bitstream, the minimum unit which permits resolution switching is a video sequence. On this recording medium, the identification information concerning the relation of resolution of plural video sequences is recorded in user data which is the information proper to the bitstream.

This sort of the recording medium is furnished as, for example, a so-called CD.

The present invention, described above, envisages to improve the compression ratio by performing encoding processing with different encoding sizes in a sole movie sequence. For handling a sole sequence with plural different resolutions, the present invention collects plural video sequences, defined by the MPEG 2, to complete a sole movie sequence, and adapts the movie sequence to the recording/reproduction of disc mediums, such as so-called DVDs or MD.

Although the disc medium has been illustrated as a recording medium in the above-described embodiments, the present invention may also be limited to a tape-shaped recording medium, such as a so-called DAT, without being limited to disc mediums.

What is claimed is:

1. A picture signal processing apparatus comprising:
    extraction means for extracting, from an inherent information region provided in each of a plurality of recording units as a minimum unit which permits the resolution in a bitstream to be changed, identification information indicating a pre-set, sole resolution of each of said recording units and the relation between said recording units; and
    control means for causing the resolutions of picture signals associated with said recording units to be switched responsive to said identification information;
    wherein each recording unit is a video sequence within a larger motion picture sequence of said bit stream, said motion picture sequence being formed by a plurality of said video sequences of different resolutions.

2. The picture signal processing apparatus according to claim 1 wherein said bitstream has, as units, a set of pictures, that is an intra-coded picture, a forward predictive-coded picture, predicted from an other picture lying forwardly in the display sequence and a bi-directionally predictive-coded picture predicted from other pictures lying in the forward and backward directions in the display sequence.

3. The picture signal processing apparatus according to claim 1 further comprising:
    insertion means for inserting the identification information into the inherent information region provided in said bitstream, said identification information showing the resolution of each of said recording units and the relation between said recording units.

4. The picture signal processing apparatus according to claim 1 wherein said identification information contains the information showing the beginning point and the end point of a set constituted by said plural recording units.

5. The picture signal processing apparatus according to claim 1 wherein said bitstream is pursuant to the MPEG (Moving Pictures Experts Group) 2 standard and wherein said recording unit is a video sequence constituting a MPEG 2 standard bitstream.

6. A picture signal processing method comprising:
    extracting, from an inherent information region provided in each of a plurality of recording units as a minimum unit which permits the resolution in a bitstream to be changed, identification information indicating a pre-set, sole resolution of each of said recording units and the relation between said recording units; and
    causing the resolutions of picture signals associated with said recording units to be switched responsive to said identification information;
    wherein each recording unit is a video sequence within a larger motion picture sequence of said bit stream, said motion picture sequence being formed by a plurality of said video sequences of different resolutions.

7. The picture signal processing method according to claim 6 wherein said bitstream has, as units, a set of pictures, that is an intra-coded picture, a forward predictive-coded picture, predicted from an other picture lying forwardly in the display sequence and a bi-directionally predictive-coded picture predicted from other pictures lying in the forward and backward directions in the display sequence.

8. The picture signal processing method according to claim 6 further comprising:
    an insertion step for inserting the identification information into the inherent information region provided in said bitstream, said identification information showing the resolution of each of said recording units and the relation between said recording units.

9. The picture signal processing method according to claim 6 wherein said identification information contains the information showing the beginning point and the end point of a set constituted by said plural recording units.

10. The picture signal processing method according to claim 6 wherein said bitstream has, as units, a set of pictures, that is an intra-coded picture, a forward predictive-coded picture, predicted from an other picture lying forwardly in the display sequence and a bi-directionally predictive-coded picture predicted from other pictures lying in the forward and backward directions in the display sequence.

11. The picture signal processing method according to claim 6 wherein said bitstream is pursuant to the MPEG (Moving Pictures Experts Group) 2 standard and wherein said recording unit is a video sequence constituting a MPEG 2 standard bitstream.

12. A picture signal recording apparatus comprising:
    control means for controlling and switching the resolution in each of a plurality of recording units to thereby set respective sole resolutions thereof, each recording unit being a minimum unit which permits the resolution in a bitstream to be changed; and
    identification information writing means for writing, in an inherent information region provided in each of said recording units, the identification information showing the resolution switched by said control means and the relation between said recording units;
    wherein each recording unit is a video sequence within a larger motion picture sequence of said bit stream, and said motion picture sequence is recorded as a plurality of said video sequences of different resolutions.

13. The picture signal recording apparatus according to claim 12 wherein said bitstream has, as units, a set of a plurality of pictures, that is an intra-coded picture, a forward predictive-coded picture, predicted from an other picture lying forwardly in the display sequence and a bi-directionally predictive-coded picture predicted from other pictures lying in the forward and backward directions in the display sequence.

14. The picture signal recording apparatus according to claim 12 wherein said bitstream is pursuant to the MPEG (Moving Pictures Experts Group) 2 standard and wherein said recording unit is a video sequence constituting a MPEG 2 standard bitstream.

15. A picture signal recording method comprising the steps of:

controlling and switching the resolution in each of a plurality of recording units to thereby set respective sole resolutions thereof, each recording unit being a minimum unit which permits the resolution in a bitstream to be changed; and writing, in an inherent information region provided in each of said recording units, the identification information showing the resolution switched in said controlling and switching step and the relation between said recording units;

wherein each recording unit is a video sequence within a larger motion picture sequence of said bit stream, and said motion picture sequence is recorded as a plurality of said video sequences of different resolutions.

16. A recording medium having recorded thereon a bitstream obtained on encoding picture signals; wherein the recording medium has a pre-set, sole resolution of each recording unit and the relation between said recording units recorded in an inherent information region provided in each of a plurality of recording units, each recording unit being a minimum unit which permits the resolution in said bitstream to be changed; and each recording unit is a video sequence within a larger motion picture sequence of said bit stream, and said motion picture sequence is recorded as a plurality of said video sequences of different resolutions.

17. The recording medium according to claim 16 wherein said bitstream has, as units, a set of a plurality of pictures, that is an intra-coded picture, a forward predictive-coded picture, predicted from an other picture lying forwardly in the display sequence and a bi-directionally predictive-coded picture predicted from other pictures lying in the forward and backward directions in the display sequence.

18. The recording medium according to claim 15 wherein said bitstream is pursuant to the MPEG (Moving Pictures Experts Group) 2 standard and wherein said recording unit is a video sequence constituting a MPEG 2 standard bitstream.

* * * * *